United States Patent [19]

Farrauto et al.

[11] Patent Number: 4,893,465
[45] Date of Patent: Jan. 16, 1990

[54] PROCESS CONDITIONS FOR OPERATION OF IGNITION CATALYST FOR NATURAL GAS COMBUSTION

[75] Inventors: Robert J. Farrauto, Westfield; Teresa Kennelly, Belle Mead; Earl M. Waterman, Vailsburg, all of N.J.

[73] Assignee: Engelhard Corporation, Edison, N.J.

[21] Appl. No.: 234,660

[22] Filed: Aug. 22, 1988

[51] Int. Cl.⁴ .............................................. F23R 3/40
[52] U.S. Cl. ...................................... 60/39.02; 60/723; 502/38
[58] Field of Search ...................... 60/39.02, 723, 746, 60/39.141, 39.06; 502/38; 423/213.5; 431/7

[56] References Cited

U.S. PATENT DOCUMENTS

| | | | |
|---|---|---|---|
| 2,941,954 | 6/1960 | Wilkes | 502/38 |
| 3,357,915 | 12/1967 | Young | 502/38 X |
| 3,384,656 | 5/1968 | McMahon | 502/38 X |
| 3,873,472 | 3/1975 | Oshima et al. | 423/213.5 X |
| 3,919,120 | 11/1975 | Kato et al. | 423/213.5 X |
| 3,926,842 | 12/1975 | Suggitt et al. | 502/38 X |
| 3,987,080 | 10/1976 | Barmby | 502/38 X |
| 4,112,675 | 9/1978 | Pillsbury et al. | 60/723 |
| 4,202,168 | 5/1980 | Acheson et al. | 60/723 |
| 4,425,255 | 1/1984 | Toyoda et al. | 502/38 |
| 4,534,165 | 8/1985 | Davis, Jr. et al. | 60/723 |
| 4,795,845 | 1/1989 | Martndale et al. | 502/38 |

FOREIGN PATENT DOCUMENTS 23034  2/1984  Japan ..................................... 60/723

Primary Examiner—Louis J. Casaregola
Assistant Examiner—Timothy S. Thorpe

[57] ABSTRACT

A method for operating a palladium oxide containing catalytic combustor useful, e.g., for powering a gas turbine. The method involves maintaining control of the temperature within the combustor in such a manner as to insure the presence of palladium oxide. By maintaining the temperature below about 800° C. decomposition of palladium oxide into metallic palladium is avoided and high catalytic activity is retained. Regeneration of catalyst following inactivation resulting from an over-temperature is accomplished by using a heat soak in the temperature range of about 530° C.–650° C.

19 Claims, 2 Drawing Sheets

PROCESS CONDITIONS FOR OPERATION OF IGNITION CATALYST FOR NATURAL GAS COMBUSTION

Burning of carbonaceous fuels is associated with formation of air pollutants, among the most troublesome of which are nitrogen oxides ($NO_x$). Nitrogen oxides form whenever air supported combustion takes place at open flame temperatures. One approach to eliminating nitrogen oxides involves chemically modifying the oxides after their formation. This approach has drawbacks, including the high cost associated with attempting to eliminate 100% of a once-formed pollutant. A more direct method of eliminating nitrogen oxides is to operate the combustion process at a lower temperature so that no formation of nitrogen oxide occurs. Such low temperature combustion can take place in the presence of catalysts, and it is to such a low temperature combustion process that this invention is directed.

This invention relates to a particularly advantageous process for the catalytically supported combustion of carbonaceous materials including natural gas or methane. In a more specific aspect, this invention relates to a process for catalytically-supported, combustion of natural gas using a palladium oxide catalyst and without the formation of substantial amounts of nitrogen oxides.

In general, conventional adiabatic, thermal combustion systems (e.g., gas turbine engines) operate at such high temperatures in the combustion zone that undesirable nitrogen oxides, especially NO, are formed. A thermal combustion system operates by contacting fuel and air in flammable proportions with an ignition source, e.g., a spark, to ignite the mixture which then will continue to burn. Flammable mixtures of most fuels burn at relatively high temperatures, i.e., about 3300° F. and above, which inherently results in the formation of substantial amounts of $NO_x$. In the case of gas turbine combustors, the formation of $NO_x$ can be reduced by limiting the residence time of the combustion products in the combustion zone. However, due to the large quantities of gases being handled, undesirable quantities of $NO_x$ are nonetheless produced.

It has long been realized that little or no NO is formed in a system which burns a fuel catalytically at relatively low temperatures. Typically, such catalytic combustion of natural gas or methane, for example, utilizes a preburner or thermal combustor which employs flame combustion to preheat combustion air to a temperature of 700° C. or higher. Once the catalyst is sufficiently hot to sustain catalysis, the preburner is shut down and all the fuel and air are directed to the catalyst. Preheat is then only due to compressor discharge. Such a catalytic combustor, if operated at temperatures below about 1300° C.–1400° C., avoids the nitrogen oxide formation which occurs at the higher temperatures which are characteristic of the flame combustion. A description of such a catalytic combustion process and apparatus is found, for example, in U.S. Pat. No. 3,928,961. See also U.S. Pat. Nos. 4,065,917 and 4,019,316.

Such catalytic combustion as described above which will function effectively at a high space velocity has, however, heretofore been generally regarded as commercially unattractive. A primary reason for this lack of commercial attractiveness has been the absence of an economically competitive method for catalytic combustion of natural gas.

The present invention is directed to a method for operating a catalytic combustor using a palladium containing catalyst and using a novel set of unexpectedly effective operating parameters which permits high catalytic activity, and results in on-going retention and regeneration of such activity. At atmospheric pressure palladium containing catalysts are known to lose activity when subjected to temperatures in excess of about 800° C., at which temperatures palladium oxide decomposes into palladium metal. The interaction of palladium oxide with reducing agents exacerbates such decomposition into palladium metal. One aspect of the present invention is concerned with compensating for an event of an over-temperature (or a continuing series of such over-temperatures) which causes catalyst deactivation. In the event of such over-temperature, the present invention utilizes procedures for regeneration of the catalyst, in-situ. For example, when start-up or operation of the catalytic combustor results in exposing the ignition catalyst to a temperature in excess of about 800° C. at atmospheric pressure, resulting in loss of catalyst activity, the over-temperature is, according to the present invention, followed by an atmospheric pressure regenerating temperature soak between about preferably 530° C.–650° C. and more preferably 560° C.–650° C., which oxidizes palladium to active palladium oxide. Even if the entire catalytic combustor does not reach a catalyst inactivating over-temperature, isolated hot spots within the catalytic combustor may be subjected to an over-temperature, and the heat soak of the present invention will provide a catalyst regenerating benefit. Thus, a regenerating temperature soak according to the present invention unexpectedly regenerates the activity lost due to an over-temperature in all or part of the combustor.

As those skilled in the art will appreciate, the above stated temperature ranges are dependent on the partial pressure of oxygen, and at higher pressures, as for example might be encountered in conjunction with generation of combustion effluent useful for operation of gas turbines, the decomposition temperature at which palladium oxide will decompose into metallic palladium will increase, as will the regeneration temperature at which palladium oxide will reform. References hereinafter to these temperatures are all at atmospheric pressures, it being understood that at enhanced partial pressure of oxygen the decomposition and regenerating temperatures will shift upward, and that the determination of such increased temperatures at higher oxygen partial pressures will be a matter well known to those skilled in the art.

THE PRIOR ART

Catalytically supported combustion processes have been described in the prior art. See, e.g. Pfefferle, U.S. Pat. No. 3,928,961. The use of natural gas or methane in catalytic combustion has been taught in the art, as has the use of a palladium catalyst to promote such combustion/oxidation. See Cohn, U.S. Pat. No. 3,056,646 wherein the use of palladium catalyst to promote methane oxidation is generically disclosed, as is an operable temperature range, 271° C.–900° C. (see column 2, lines 19–25). Note also that this patent states "the higher the operating temperature, the shorter will be the catalyst life and the more difficult will be subsequent ignition after catalyst cooling". Other patents directed to the use of platinum group metals as catalysts for methane oxidation at temperatures above 900° C. include U.S. Pat.

Nos. 3,928,961; 4,008,037; and 4,065,917. The literature also describes the thermal decomposition of PdO to Pd metal at temperatures of 800° C. in air at atmospheric pressure. See *Kirk Othmer Encyclopedia of Chemical Technology*, Vol. 18, p. 248 which states that palladium acquires a coating of oxide when heated in air from 350° C. to 790° C. but that above this temperature the oxide decomposes and leaves the bright metal.

The present invention finds particular utility in a process for the start-up of catalytically supported combustion. Prior art references directly related to such start-up are Pfefferle, U.S. Pat. No. 4,019,316 and Pfefferle, U.S. Pat. No. 4,065,917.

SUMMARY OF THE INVENTION

This invention relates to a method for operating a palladium oxide containing catalytic combustor useful, e.g., for powering a gas turbine. The invention involves maintaining control of the temperature within the catalytic combustor in such a manner as to insure the presence of active palladium oxide. By maintaining the temperature below about 800° C., decomposition of palladium oxide into metallic palladium is avoided and high catalytic activity is maintained. However, in the event of an over-temperature, or reduction of palladium oxide as a result of chemical interaction with a reducing agent, such as an excess of fuel, regeneration of catalyst following inactivation due to loss of PdO can be accomplished by bringing the deactivated catalyst to a temperature within the regenerating temperature range of about preferably 530° C.-650° C., and more preferably 560° C.-650° C., where reoxidation occurs at a reasonable rate.

BRIEF DESCRIPTION OF THE DRAWINGS

The present invention is described and illustrated with reference to the following drawings, in which

FIG. 1 depicts a combustor with a precombustion chamber, 20, fed by air, 15, which is exiting from compressor, 25, and fuel nozzle, 13, which is connected to fuel line, 14. The fuel and air together pass through mixer, 17, prior to entering the precombustion chamber, 20. Feeding into the precombustion chamber is a preburner 12, also connected to the air line, 15, and fuel line, 14, which sprays hot combustion gases from injector line, 18. The catalyst is positioned on a supporting monolith, 10, from which the hot combustion gases move downstream to drive turbine, 30.

The procedure used to obtain the data graphed in FIG. 2 was as follows: first a sample of a conventional palladium on aluminum oxide catalyst was prepared according to a standard procedure, viz., gamma alumina was calcined at 950° C. for 2 hours and then screened to particle sizes between of 50 and 150 microns. This gamma alumina was used as a catalyst carrier. The use of gamma alumina as a catalyst carrier in this example was, as those skilled in the art will readily appreciate, simply a matter of choice. Other suitable carriers include, for example, modified alumina (i.e. aluminas which contain surface area stabilizers such as silica, barium oxide, lanthanum oxide and cerium oxide) silica, zeolites, titania, zirconia and ceria as well as mixtures of the foregoing. Ten grams of the described alumina carrier was impregnated with a $Pd(NO_3)_2 \cdot 6H_2O$ solution by the incipient wetness method to give approximately 4 wt % Pd on the finished catalyst. The Pd was then fixed on the catalyst by a conventional reduction with an aqueous hydrazine solution. The reduced catalyst was dried at 120° C. overnight and calcined at 500° C. for 2 hours to give what will hereafter be designated as "fresh catalyst".

Figure 1:
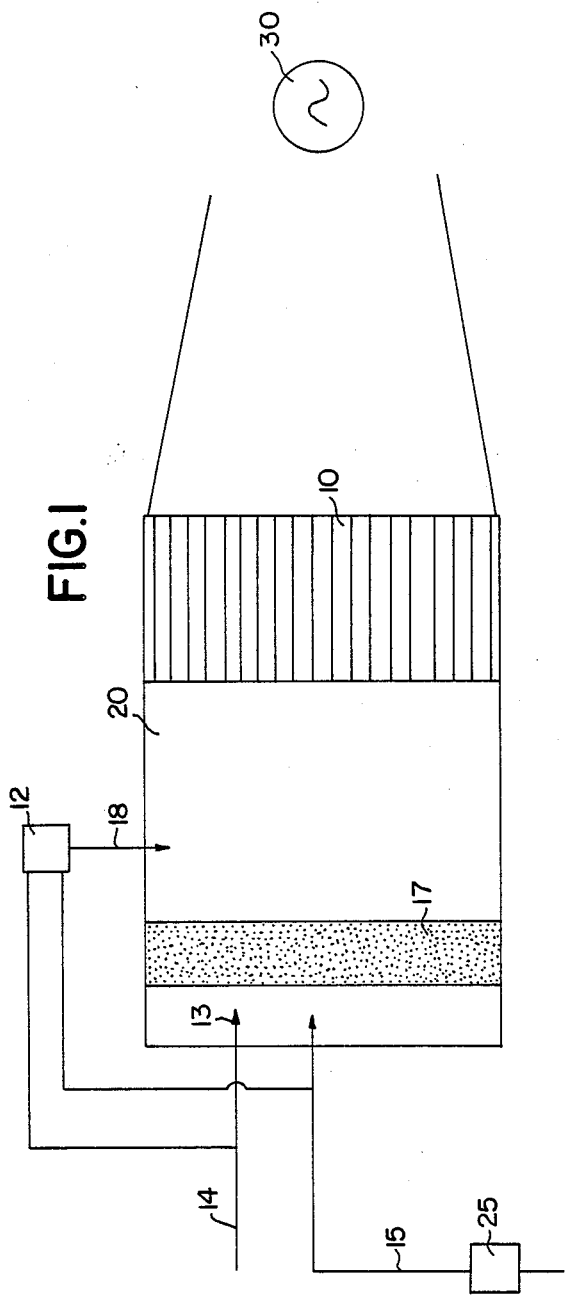
FIG. 1 is a partial schematic breakaway view of a preburner/catalytic combustor system which is operable in accordance with the present invention.
Figure 2:
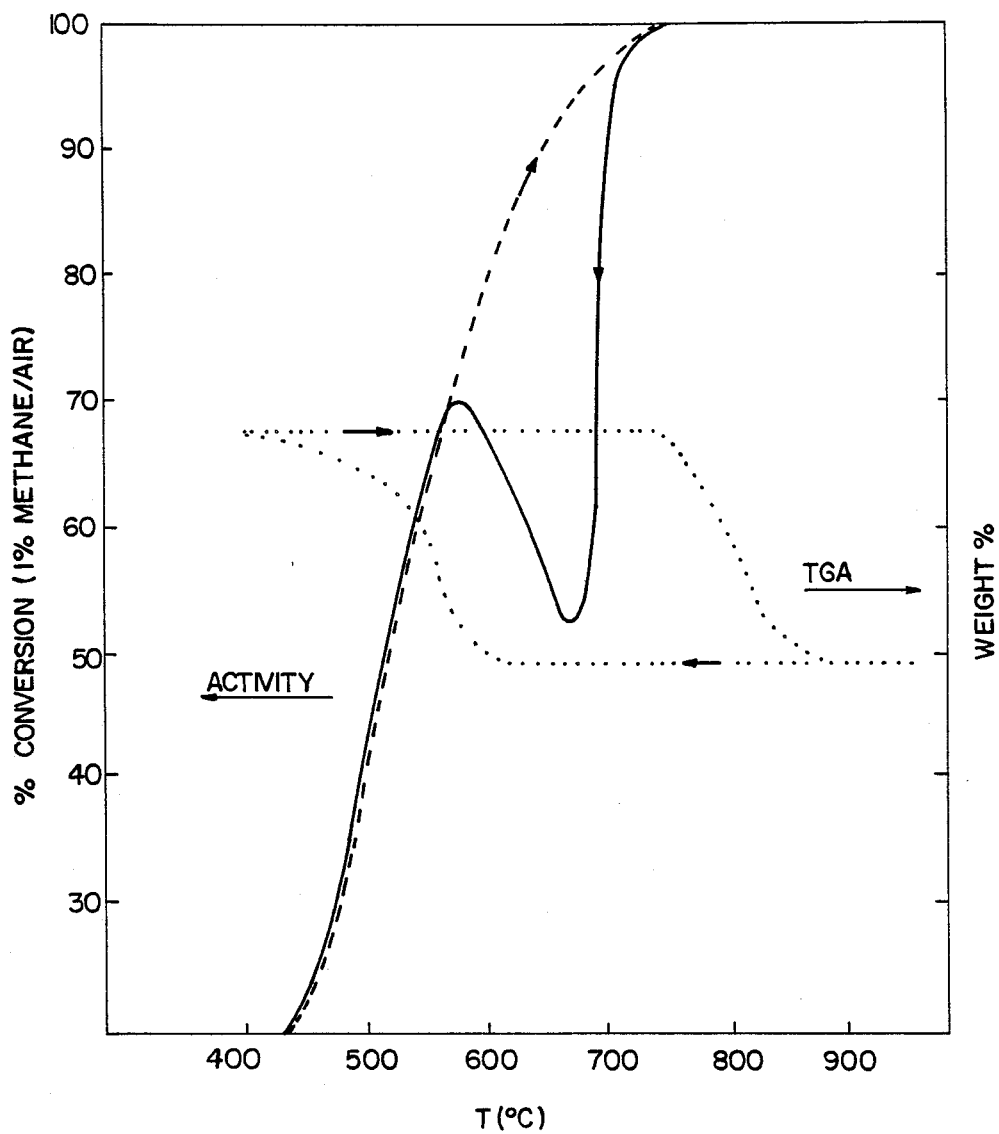
FIG. 2 is a thermal gravimetric analysis (TGA) plot in air of temperature versus sample weight, as set out on the right ordinate. Superimposed on this TGA plot, is a plot of temperature versus percent conversion of 1% methane in air (an indice of activity), as shown on the left ordinate.

The TGA profile of FIG. 2 was generated by heating this fresh PdO on $Al_2O_3$ catalyst in air at 20° C./min. The heating portion of the graph depicts a weight loss above about 800° C. where decomposition of PdO to Pd metal occurs. Following decomposition, heating continued to 1100° C. where it was held for 30 minutes.

The temperature program was then reversed allowing the catalyst to cool in air. Unexpectedly, no weight increase due to re-oxidation of the Pd metal was observed until about 650° C. below which a sharp increase was observed which plateaus at about 560° C. to 530° C. Upon continued cooling below 530° C. there was a small but steady weight increase down to room temperature. Repeated heating and cooling cycles of the same sample demonstrates the same temperature dependent weight changes.

Referring to the other data graphed on FIG. 2, the percent conversion plot as read on the left ordinate of FIG. 2 is a measure of catalytic activity.

The procedure used to obtain the graphed data on catalytic activity was as follows: a sample of catalyst (0.06 g), prepared as described above, was mixed with 2.94 g diluent (alpha alumina) which had been screened to a particle size range of from 50 to 150 microns. This 3 g catalyst charge was supported on a porous quartz frit in a 1" diameter quartz reactor tube. The tube was then positioned vertically in a programmable tube furnace. A thermocouple was positioned axially in the catalyst bed for continuous monitoring and connections to a gas (fuel) stream secured. A fuel mixture of 1% methane in zerograde air metered by a mass flow controller was flowed through the system at a rate of 3 liters per minute. The use of methane as a fuel was, as those skilled in the art will readily appreciate, simply a matter of choice. Other suitable fuels would include, for example, natural gas, ethane, propane, butane, other hydrocarbons, alcohols, other carbonaceous materials, and mixtures thereof. The gas exiting the reactor was analyzed by a Beckman Industrial Model 400A Hydrocarbon Analyzer. The analyzer was zeroed on air and spanned to 100% on the fuel mixture at ambient conditions. The procedure was initiated by ramping the furnace to a selected maximum temperature. This temperature was held for a limited time and then the furnace was shut off and the reactor permitted to cool. A multichannel strip chart simultaneously recorded the catalyst bed temperature and the concentration of hydrocarbon in the gas stream. This data thus provided a profile of the temperature dependence of methane oxidation/combustion.

The activity of the catalyst, as determined by the percent conversion of the methane fuel, was measured at various increasingly higher combustion start-up temperatures and the results were plotted as the dashed line in FIG. 2. FIG. 2 shows that at progressively higher temperatures the percent conversion of the methane becomes greater, until at approximately 800° C. the conversion becomes essentially 100%. At this temperature, the reaction in effect became a thermal reaction as opposed to a catalytic reaction. The activity data in FIG. 2 also demonstrates that the continuous, rapid increase in percent conversion with an increase in temperature is followed by a rapid decrease in percent conversion with a reduction in temperature. The decrease in percent conversion (or activity) undergoes a reversal below about 700° C. during a cooling cycle, at which point percent conversion (activity) begins to increase until a temperature of about 600° C. is obtained. At that point, the catalyst again demonstrated the same activity as the catalyst had initially demonstrated (during the heating cycle) at that temperature. This observation was made for all repeated cycles.

EXAMPLE 2

Further catalyst samples were pre-calcined in air for 17 hours to 1100° C. followed by cooling in air to room temperature. TGA profiles of these samples were qualitatively identical to second cycles of fresh samples. Thus, in both cases the PdO decomposes to Pd metal during heat-up, and PdO forms below about 650° C. during cool down.

EXAMPLE 3

PdO powder was prepared using the identical procedure as for PdO on $Al_2O_3$. Heating of this sample clearly showed only one weight loss process between 810° C. and 840° C. in which the PdO decomposes to Pd metal. The weight loss observed, approximately 13%, agrees with decomposition of PdO to Pd.

EXAMPLE 4

Samples of $PdO/Al_2O_3$ were calcined to 1100° C. in air and evaluated for activity as a function of temperature as described above. During heat-up, conversion was first noted at about 340° C. and slowly rose to 30% at about 430° C. after which percent conversion rapidly increased with temperature up to 90% at about 650° C. Above this temperature the thermal process became significant. The furnace ramp continued to increase catalyst temperature up to 1000° C., well beyond the temperature of decomposition of PdO to Pd metal. The temperature was then reduced and the sample cooled in $CH_4$/air. At about 720° C. the thermal process began to extinguish and the conversion fell far below the conversion observed during heat up, demonstrating that the catalyst had lost activity during cooling. The catalyst activity at this point became virtually zero.

As the $Pd/Al_2O_3$ continued to cool and the conversion due to the thermal component decreased to about 50% there was a sudden unexpected increase in activity at about 680° C. and a maximum of 70% at 650° C. The conversion curve upon continued cooling effectively overlaps that generated during heat up.

The TGA profile on a sample of the same catalyst, calcined to 1100° C. in air for 17 hours clearly showed decomposition of PdO to Pd metal during heating. Upon cooling the large hysteresis in reoxidation is observed to occur around 650° C. and is complete at 575° C. closely paralleling the activity performance.

EXAMPLE 5

A sample of fresh catalyst was heated in air to 950° C., well beyond the range where any weight loss occurred. The sample was then cooled to 680° C. and held at that temperature for 30 minutes. No weight gain occurred. The sample was then cooled to 650° C. at which temperature weight gain commenced. This example thus demonstrates that the hysteresis depicted in FIG. 2 is not a rate process.

EXAMPLE 6

A sample of fresh catalyst was heated in air to 950° C., and then cooled to 680° C. and held at that temperature for 30 minutes as in Example 5. The activity of the catalyst as indicated by its ability to catalyze the combustion of 1% methane in air was then measured. The catalyst was then cooled to 650° C. and its activity again measured. The activity at 650° C. was much greater than at 680° C., again demonstrating that the hysteresis depicted in FIG. 2 is not the result of a rate process.

These examples demonstrate that activity of a palladium oxide containing catalyst, as measured by its ability to promote the oxidation of methane, can be preserved by utilizing temperatures below about 800° C., and that if activity is lost through over-temperature, original activity can be restored by using a heat soak in the unexpectedly effective range of 530° C.–650° C.

We claim:

1. A process for starting a combustion system to catalytically combust carbonaceous fuels with air in a combustor in the presence of a palladium oxide containing catalyst, which comprises utilizing a flow of hot gases from a preburner to heat said catalyst to a first temperature in excess of the decomposition temperature of the catalyst, said decomposition temperature at atmospheric pressure being at least about 800° C., and thereafter reducing the flow of hot gases from the preburner while supplying air and fuel for combustion to the combustor downstream of said preheater, and thereafter restoring catalytic activity by lowering the temperature of the catalyst into a regenerating temperature range which at atmospheric pressure is from about 530° C. to about 650° C. and maintaining the temperature within that range until desired catalytic activity is achieved and thereafter maintaining the catalyst below about 800° C.

2. The process of claim 1 wherein the carbonaceous material is natural gas.

3. The process of claim 1 wherein the carbonaceous material is methane.

4. The process of claim 1 wherein restored catalytic activity is achieved by lowering the temperature of the catalyst into a regenerating temperature range which at atmospheric pressure is from about 560° C. to about 650° C.

5. The process of claim 1 wherein the palladium oxide containing catalyst is supported on a modified aluminum oxide carrier.

6. The process of claim 1 wherein combustion effluent is employed to run a gas turbine.

7. A process for starting a combustion system to catalytically combust carbonaceous fuels with air in a combustor in the presence of a palladium oxide containing catalyst, which comprises utilizing a flow of hot gases from a preburner to heat said catalyst to a first temperature in excess of at least about 700° C., and thereafter reducing the flow of hot gases from the preburner while supplying air and fuel for combustion to the combustor downstream of said preheater, and thereafter restoring catalytic activity by lowering the temperature of the catalyst into a regenerating temperature range which at atmospheric pressure is from about 530° C. to about 650° C. and maintaining the temperature within that range until desired catalytic activity is achieved and thereafter maintaining the catalyst below about 800° C.

8. The process of claim 7 wherein the carbonaceous material is natural gas.

9. The process of claim 7 wherein the carbonaceous material is methane.

10. The process of claim 7 wherein restored catalytic activity is achieved by lowering the temperature of the catalyst into a regenerating temperature range which at atmospheric pressure is from about 560° C. to about 650° C.

11. The process of claim 7 wherein the palladium oxide containing catalyst is supported on a modified aluminum oxide carrier.

12. The process of claim 7 wherein combustion effluent is employed to run a gas turbine.

13. In a process for catalytic combustion of carbonaceous materials using a palladium oxide containing catalyst, wherein the catalyst for said catalytic combustion reaction is subjected to temperatures in excess of the decomposition temperature of the catalyst which at atmospheric pressure is at least about 800° C., the improvement comprising restoring catalytic activity by lowering the temperature of the catalyst into a regenerating temperature range which at atmospheric pressure is from about 530° C. to about 650° C. and maintaining the temperature within that range until desired catalytic activity is achieved.

14. The process of claim 13 wherein the carbonaceous material is natural gas.

15. The process of claim 13 wherein the carbonaceous material is methane.

16. The process of claim 14 wherein restored catalytic activity is achieved by lowering the temperature of the catalyst into a regenerating temperature range which at atmospheric pressure is from about 560° C. to about 650° C.

17. The process of claim 13 wherein the palladium oxide containing catalyst is supported on a modified aluminum oxide carrier.

18. The process of claim 13 wherein combustion effluent is employed to run a gas turbine.

19. The process of claim 13 wherein the temperature in excess of the decomposition temperature is reached during startup.

* * * * *

UNITED STATES PATENT AND TRADEMARK OFFICE
CERTIFICATE OF CORRECTION

PATENT NO. : 4,893,465
DATED : January 16, 1990
INVENTOR(S) : R. J. Farrauto et al It is certified that error appears in the above-identified patent and that said Letters Patent is hereby corrected as shown below:

In claim 7, column 6, line 62, delete "700$^{\circ}$C" and insert therefor --800$^{\circ}$C--.

Signed and Sealed this

Twenty-first Day of September, 1993

Attest:

BRUCE LEHMAN

Attesting Officer

Commissioner of Patents and Trademarks